United States Patent [19]

Matsuyama et al.

[11] Patent Number: 5,280,102
[45] Date of Patent: Jan. 18, 1994

[54] HEAT-RESISTANT BONDING MATERIALS

[75] Inventors: Haruhiko Matsuyama, Hiratsuka; Fusaji Shoji, Yokohama; Atsushi Honda, Kokubunji; Teruki Aizawa, Shimodate, all of Japan

[73] Assignees: Hitachi, Ltd.; Hitachi Chemical Co., both of Tokyo, Japan

[21] Appl. No.: 500,503

[22] Filed: Mar. 28, 1990

[30] Foreign Application Priority Data

Mar. 28, 1989 [JP] Japan .................. 1-75677

[51] Int. Cl.$^5$ .............. C08G 73/10; C08G 69/26; C08G 8/02
[52] U.S. Cl. ...................... 528/353; 528/26; 528/38; 528/125; 528/126; 528/128; 528/170; 528/172; 528/176; 528/182; 528/185; 528/188; 528/220; 528/224; 528/229; 528/351; 428/473.5
[58] Field of Search .............. 428/473.5; 528/128, 528/125, 126, 26, 28, 182, 170, 188, 172, 224, 176, 229, 185, 220, 351, 353

[56] References Cited

U.S. PATENT DOCUMENTS

| | | | |
|---|---|---|---|
| 4,686,147 | 8/1987 | Matsuyama et al. | 428/473.5 |
| 4,748,228 | 5/1988 | Shoji et al. | 528/182 |
| 4,824,731 | 4/1989 | Matsuyama et al. | 428/478.5 |
| 4,956,450 | 9/1990 | Lee et al. | 528/125 |

FOREIGN PATENT DOCUMENTS

| | | |
|---|---|---|
| 54-69065 | 2/1979 | Japan . |
| 61-264023 | 11/1986 | Japan . |
| 62-199674 | 9/1987 | Japan . |
| 63-252344 | 10/1988 | Japan . |
| 3-020378 | 1/1991 | Japan . |

OTHER PUBLICATIONS

ECC. Proc. 374h:1987, pp. 96–109.
Derwent Accession No. 89-089 995.
Chemical Ab. 105:44894k "Electroconductive Resin Compositions", Yamagushi et al.
"Whithington's Dictionary of Plastics Surfactants", p. 233.

*Primary Examiner*—John Kight, III
*Assistant Examiner*—P. Hampton-Hightower
*Attorney, Agent, or Firm*—Antonelli, Terry, Stout & Kraus

[57] ABSTRACT

Heat-resistant bonding materials are composed of a polyimide precursor end-capped at molecule ends thereof and/or an imide compound formed from the polyimide precursor. They may also contain fine particles of at least one material selected from metals, metal oxides, metal carbides and metal nitrides.

14 Claims, 1 Drawing Sheet

HEAT-RESISTANT BONDING MATERIALS

BACKGROUND OF THE INVENTION

1) Field of the Invention:

The present invention relates to heat-resistant bonding materials suitable for use in die-bonding of pellets for IC (an integrated circuit) and LSI (a large-scale integration).

2) Description of the Related Art:

In a semiconductor device, a semiconductor chip is bonded to an insulating substrate or to a metal frame which serves as a support. Further, the semiconductor pellet is electrically connected to leads formed on the substrate, for example, by way of wires. The resulting assembly is then hermetically sealed with a metal, ceramic cap, molding resin or the like.

As a bonding method for semiconductor pellets, it has been the practice to use an epoxy resin as a bonding layer, to form an Au—Si eutectic by heat treatment with an Au foil and then to use the same as a bonding layer, or to employ glass as a bonding layer. These methods are described in detail in Publication of Unexamined Japanese Patent Application (Kokai) No. 54-69065 and E.C.C. Proceedings, 37, 96–109 (1987).

There is a strong demand for ceramic CMOS packages for large computers in recent years. Their developments are now under way. Large chips of 10 mm×10 mm or greater are used in such ceramic packages. These large chips have however developed inter alia the following problems:

(1) Chipping or breakage of pellets due to the concentration of stresses in bonding layers upon their bonding; and (2) Deterioration of the bonding layers because of the thermal history upon glass sealing.

The problem (1) tends to take place especially when an Au-Si eutectic or glass layer, which forms a rigid bonding layer, is used. The problem (2) tends to occur when an epoxy resin is used as a bonding layer.

As adhesive materials which may be able to overcome these problems, the high heat-resistance polyimide resins disclosed in Publication of Unexamined Japanese Patent Application (Kokai) Nos. 61-264023 and 62-199674 have attracted attention.

To obtain desired bonding strength, these polyimide resins require the application of a pressure of 2.0–3.9 MPa upon bonding. Application of such a large compression bonding force upon die bonding of a pellet however results in deleterious effects, such as chipping or breakage, cracking of passivation film or disconnection a device.

With a view toward avoiding this problem, pellets are bonded by potting using a polyimide resin in the form of a varnish. This method has however found to involve the problem that the bonding material adversely affect the quality of devices by (1) an overflow of the varnish to the wire bonding areas of package bases and (2) an increase of thermal resistance due to the occurrence of voids within the bonding layer as a result of evaporation of the solvent upon heat setting of the varnish.

SUMMARY OF THE INVENTION

An object of the invention is therefore to provide a heat-resistant bonding material which can provide high bonding strength even under a low bonding pressure and is therefore suitable for use in die bonding.

The above object can be attained by a heat-resistant bonding material which comprises a polyimide precursor end-capped at molecule ends thereof and/or an imide compound formed from the polyimide precursor.

By end-capping molecule ends and hence adjusting the molecular weight, it is possible to adjust physical properties such as melting point, viscosity and softening point and bonding ability to levels suitable for the bonding between a package base and a pellet.

Use of the heat-resistant bonding material of the invention has made it possible to avoid large cracking of pellets and thus to provide an improved production yield, although they can hardly be achieved when rigid bonding layers such as an Au-Si eutectic are used.

In addition, a polyimide compound features high heat resistance. Unlike epoxy-type bonding materials, the heat-resistant bonding material of the invention has also made it possible to prevent the evolution of a gas during high-temperature processing (about 400° C.) upon hermetic sealing, so that the formation of blow holes can be avoided.

To impart electrical conductivity, improved thermal conductivity and greater strength to a bonding layer to be formed by the setting of the bonding material, the heat-resistant bonding material according to the invention can be mixed with fine particles of at least one material selected from metals, metal oxides, metal carbides and metal nitrides.

The mixing of the fine particles can provide a bonding layer with improved electrical and thermal conductivity, whereby the fine particles can enhance the ability to release heat to a substrate upon drive of a device formed on the pellet. It is therefore possible to prevent the characteristics of the device from being deterioration by the generation of heat.

The invention therefore provides a bonding material which has high heat resistance, high bonding strength and high stress relaxing property, does not develop cracking of pellets and is hence suited for die bonding. Unlike the conventional art, it is no longer required to use expensive Au—Si eutectic crystals for die bonding. A substantial manufacturing cost reduction can therefore be achieved by the invention.

BRIEF DESCRIPTION OF THE DRAWING

The above and other objects, features and advantages will become apparent from the following description and the appended claims, taken in conjunction with the accompanying sole drawing, in which:

DESCRIPTION OF THE INVENTION AND PREFERRED EMBODIMENTS

Figure 1:
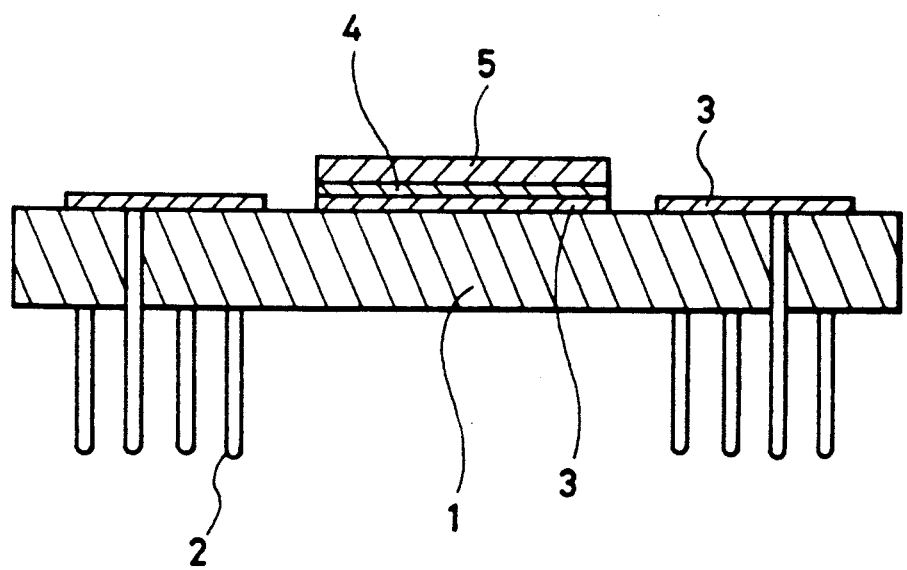
FIG. 1 is a cross-sectional view of an arrangement for the evaluation of the bonding material in each example of the invention.

The term "polyimide precursor" as used herein means a compound represented by any one of the following formulae (I), (II) and (III):

Formula (1)

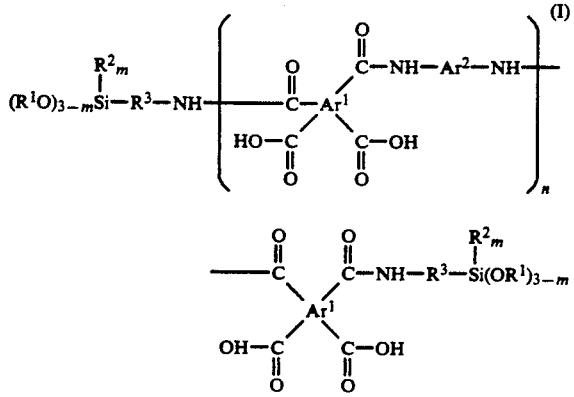

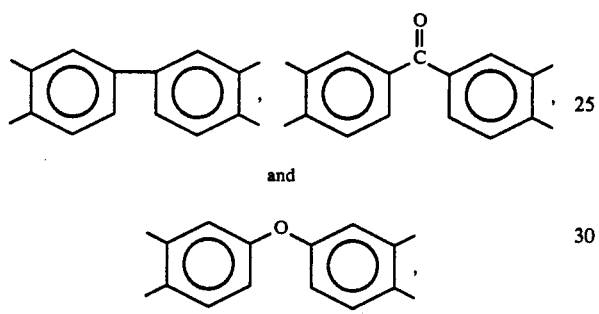

wherein Ar¹ means at least one group selected from the following groups:

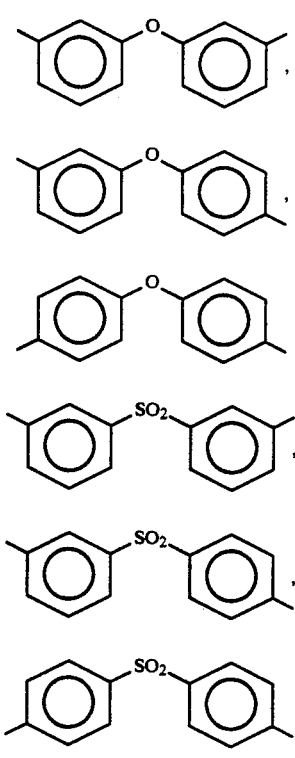

Ar² denotes at least one group selected from the following groups:

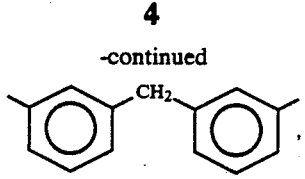

$R^1$ represents a methyl, ethyl, propyl, butyl or phenyl group, $R^2$ is a methyl, ethyl, butyl, phenyl, methoxy, ethoxy, propoxy, butoxy or phenoxy group, $R^3$ means a methylene, ethylene, proplyene, butylene or phenylene group, m stands for 0, 1, 2, or 3, and n ranges from 1 to 100.

Formula (2)

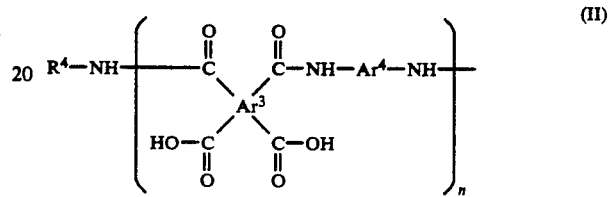

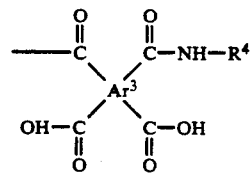

wherein $R^4$ means at least one group selected from the following groups:

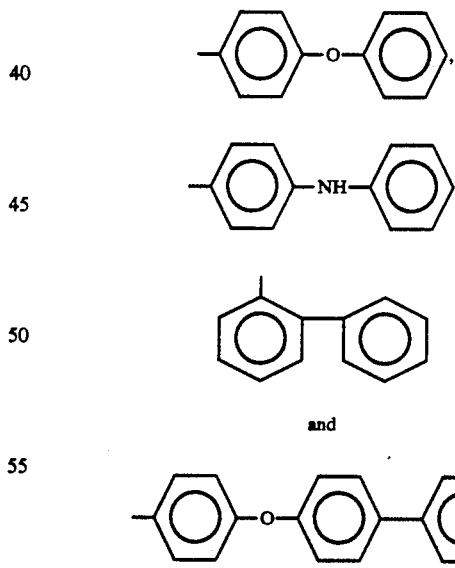

Ar³ denotes at least one group selected from the following groups:

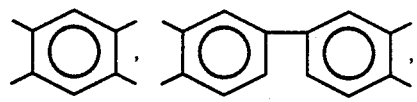

-continued
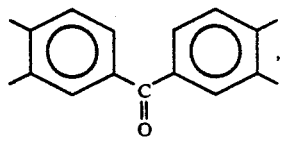
and
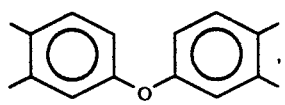
Ar⁴ represents at least one group selected from the following groups:
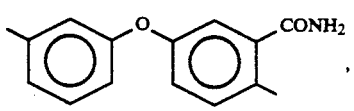
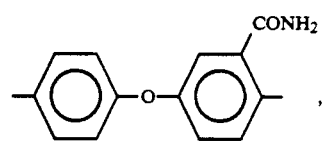
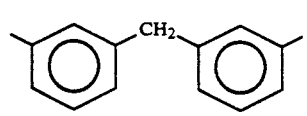
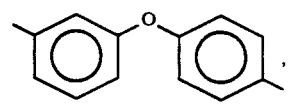
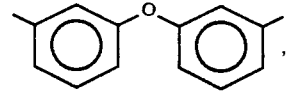
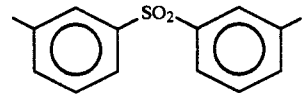
and
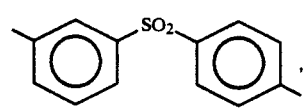
and n ranges from 1 to 100.
Formula (3)
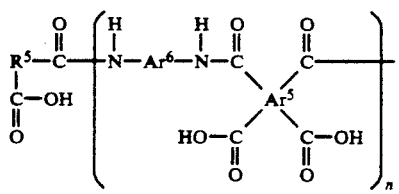
(III)
-continued
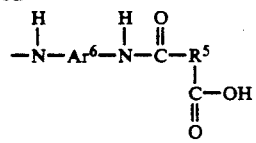
wherein Ar⁵ means at least one group selected from the following groups:
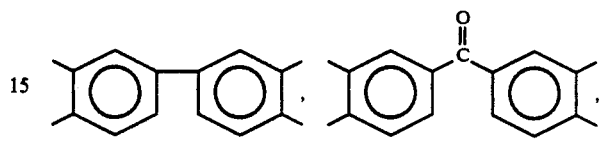
and
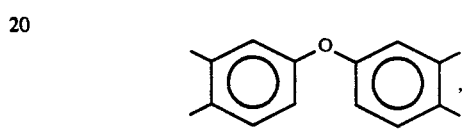
Ar⁶ denotes at least one group selected from the following groups:
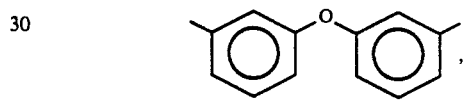
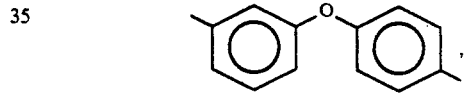
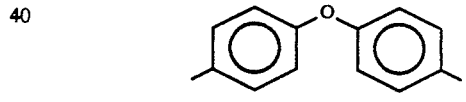
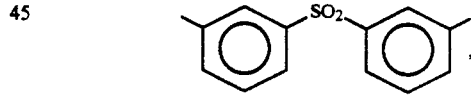
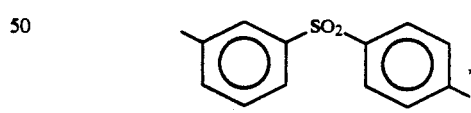
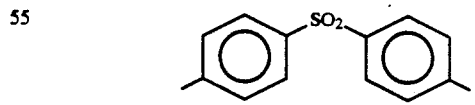
and
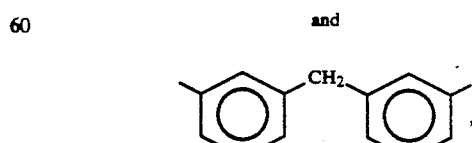
R⁵ represents at least one group selected from the following groups:

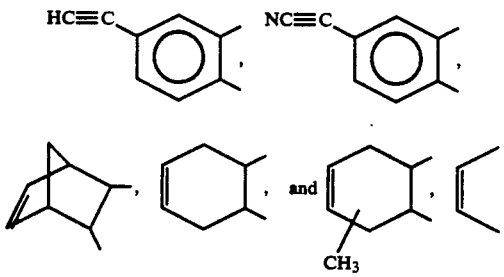

and n ranges from 1–100.

The bonding material may preferably in the form of a varnish or film.

The polyimide precursor of the formula (I) can be synthesized by using, as raw materials, the following compounds:

Diamine having the following formula (a)

$$H_2N-Ar^2-NH_2 \quad (a)$$

Acid dianhydride having the following formula (b)

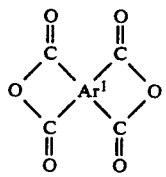 (b)

End-capping agent having the following formula (c)

$$(R^1O)_{3-m}\overset{R^2{}_m}{\underset{|}{Si}}-R^3-NH_2 \quad (c)$$

On the other hand, the polyimide precursor of the formula (II) can be synthesized by using, as raw materials, the following compounds:

Diamine having the following formula (d)

$$H_2N-Ar^4-NH_2 \quad (d)$$

Acid dianhydride having the following formula (e)

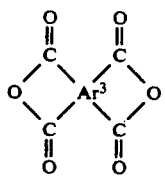 (e)

End-capping agent having the following formula (f)

$$R^4-NH_2 \quad (f)$$

In addition, the polyimide precursor of the formula (III) can be synthesized by using, as raw materials, the following compounds:

Diamine having the following formula (g)

$$H_2N-Ar^6-NH_2 \quad (g)$$

Acid dianhydride having the following formula (h)

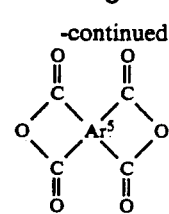 (h)

End-capping agent having the following formula (i)

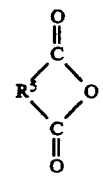 (i)

After a four-necked flask fitted with a condenser, a gas inlet tube and a stirring rod is thoroughly purged with nitrogen gas, the flask is charged with a synthesis solvent (e.g., N,N-dimethylacetamide) which has been rendered anhydrous by dehydrating distillation in the presence of calcium hydride. Next, a predetermined amount of a diamine is added and dissolved. When the end-capping agent is an amine-type end-capping agent of the formula (c) or (f), the end-capping agent is also added at the same time. An acid dianhydride in an amount equal in equivalent to the amine thus added is added gradually so that the temperature of the liquid mixture in the flakes remains below 40° C. At the same time, a small amount of the synthesis solvent is also added dropwise in such a way that the acid dianhydride adhered on the wall of the flask is washed away. When the end-capping agent is an acid anhydride of the formula (i), it is also added and dissolved at the same time as the acid dianhydride. The resulting mixture is stirred at room temperature for 8 hours. The reaction mixture is then heated over an oil bath. The reaction mixture is stirred for 4–24 hours at a liquid temperature of 75° C., whereby a varnish-like heat-resistant bonding material having good viscosity stability is obtained. It is to be noted that a portion of the polyimide precursor in the varnish can be imidated by raising the heating temperature to 80° C. or higher.

When the heat-resistant bonding material is added with fine particles of a material selected from metals, metal oxides, metal carbides and metal nitrides to impart properties such as electrical conductivity, high thermal conductivity and high strength, the fine particles are added to the above-obtained varnish either directly or after once dispersed in a similar solvent to that employed upon synthesis of the polyimide precursor. The resultant mixture is then processed by a means having high dispersing effects, such as a ball mill or roll mill, so that a heat-resistant bonding agent is obtained as a varnish in the form of a uniform suspension.

To form a bonding material in a film form from a varnish obtained as described above, the varnish is coated on a smooth substrate that can withstand heat to which the substrate is exposed during a film-forming step to be described subsequently, such as a glass plate or polyethylene film by a coater defining a constant clearance such as a doctor blade or by a film-forming method capable of providing a uniform film thickness such as spin coating or dipping. The substrate is then heated and dried, whereby a film heat-resistant bonding material is obtained. Here, it is only necessary to heat the thus-coated substrate under such conditions that the solvent in the varnish is caused to evaporated to provide the coating as a discrete film. The film in this state is obviously composed of a mixture of the polyimide precursor and a polyimide, because it contains the solvent in a smaller amount compared with the varnish and heating has been conducted to obtain the coating as a discrete film.

When the varnish bonding material is not mixed with fine particles of at least one material selected from metals, metal oxides, metal carbides and metal nitrides, it is preferred that the solid weight accounts for 1–50 wt. % and the remainder comprises the solvent. If the solid weight is smaller than the lower limit, it is difficult to obtain a bonding layer of a sufficient thickness. The thickness of the bonding layer will therefore be irregular. Such a small solid weight hence tends to result in lower bonding strength. On the other hand, a solid weight greater than the upper limit will result in a varnish prone to gelation so that difficulties will be encountered upon handling the varnish as a bonding material.

When the varnish bonding material is mixed with fine particles of at least one material selected from metals, metal oxides, metal carbides and metal nitrides, it is preferred that the solid weight accounts for 10–95 wt. % and the remainder comprises the solvent. If the solid weight is smaller than the lower limit, it is difficult to obtain a bonding layer of a sufficient thickness. The thickness of the bonding layer will therefore be irregular. Such a small solid weight hence tends to result in lower bonding strength. On the other hand, a solid weight greater than the upper limit will result in a varnish having high viscosity so that difficulties will be encountered upon handling the varnish as a bonding material.

The mixing weight ratio of the fine particles contained to the polyimide precursor and/or the imide compound formed from the polyimide precursor may preferably range from 0.05 to 5. Mixing ratios smaller than the lower limit can hardly bring about the effects of the fine particles. Mixing ratios greater than the upper limit result in unduly small proportions of the polyimide precursor end-capped at molecule ends thereof and/or the imide compound formed from the polyimide precursor, in other words, the bonding components, so that the resulting mixtures can rarely exhibit effects as bonding materials. Such great mixing ratios of the fine particles tend to result in reducing bonding strength.

Especially, to furnish a preferably-usable film bonding material, it is desired—irrespective of the inclusion or exclusion of fine particles of at least one material selected from metals, metal oxides, metal carbides and metal nitrides—that the solid weight is 60–100% and the remainder comprises a solvent. If the solid weight is smaller than the lower limit, the resulting bonding layer tends to develop blisters and hence a bonding strength reduction and also smearing of the associated pellet and/or substrate as a result of evaporation of the solvent upon setting of the bonding material. Such a small solid weight leads to a film having stickiness before its setting and hence tends to result in reduced working efficiency.

As the solvent, an organic solvent is suited. Especially, a solvent which can be suitably used for the synthesis of the polyimide precursor end-capped at molecule ends thereof is preferred from the standpoint of solubility. Described specifically, the solvent is composed preferably of at least one solvent selected from N,N-dimethylacetamide, N-methyl-2-pyrrolidone, benzylpyrrolidone and diethylene glycol dimethyl ether.

A description will next be made of fine particles of a material selected from metals, metal oxides, metal carbides and metal nitrides.

No particular limitation is imposed on the metallic material of the fine particles as long as it can increase the electrical conductivity and thermal conductivity. Preferably, the material is at least one metal selected from Al, Ag, Au, Cu and Ni, at least one metal oxide selected from $Al_2O_3$, $SiO_2$, $In_2O_3$, $SnO_2$ and $Sb_2O_5$, SiC as a metal carbide, or AlN as a metal nitride.

The fine particles of at least one material selected from the metals, metal oxides, metal carbides and metal nitrides preferably have an average particle size not greater than 10 μm from the standpoint of maintaining the uniformity of the thickness of a bonding layer.

Further, as the shape of the fine particles, a flaky shape is preferred from the standpoint of maintenance of uniformity of the thickness of a bonding layer especially in the case of bonding materials in a film form. When a metal having high electrical conductivity and thermal conductivity such as Al, Ag, Au, Cu or Ni is formed into a flaky shape, a greater area of contact is provided so that the electrical conductivity and thermal conductivity of the bonding layer can be improved successfully.

It is also preferred to apply surface treatment to these fine particles in order to avoid their aggregation and improve the uniformity of a bonding layer. Surface treatment with at least one of stearic acid, zinc stearate and aluminum stearate is preferred, although no limitation is imposed on the treating material employed for this surface treatment.

The invention will hereinafter be described in detail by the following examples, but it is to be understood that the invention is not limited thereto.

EXAMPLE 1

Synthesis of Bonding Material in a Varnish Form

After a four-necked 1-l flask fitted with a condenser, a gas inlet tube and a stirring rod was thoroughly purged with nitrogen gas, the flask was charged with 300 g of anhydrous N,N-dimethylacetamide which had been subjected to dehydrating distillation in the presence of calcium hydride. Next, 49.232 g (0.246 mole) of 3,4'-diaminodiphenyl ether and 1.919 g (0.010 mole) of 3-aminopropyldiethoxymethylsilane were added and dissolved. 73.849 g (0.251 mole) of 3,3',4,4'-biphenyltetracarboxylic dianhydride were gradually added while the liquid temperature was maintained below 40° C. in the flask. At the same time, 75 of dimethylacetamide were added dropwise in such a way that the acid dianhydride adhered on the wall of the flask was washed away.

The resulting mixture was stirred at room temperature for 8 hours. The reaction mixture was then heated over an oil bath. The reaction mixture was stirred for 8 hours at a liquid temperature of 75° C., whereby a heat-resistant bonding material in a varnish form of a yellowish brown color was obtained. The bonding material had a solid weight of 25 wt. % and a viscosity of 22.5 Pa.s (as measured at 25° C.) and contained a bonding component represented by the following formula (IV):

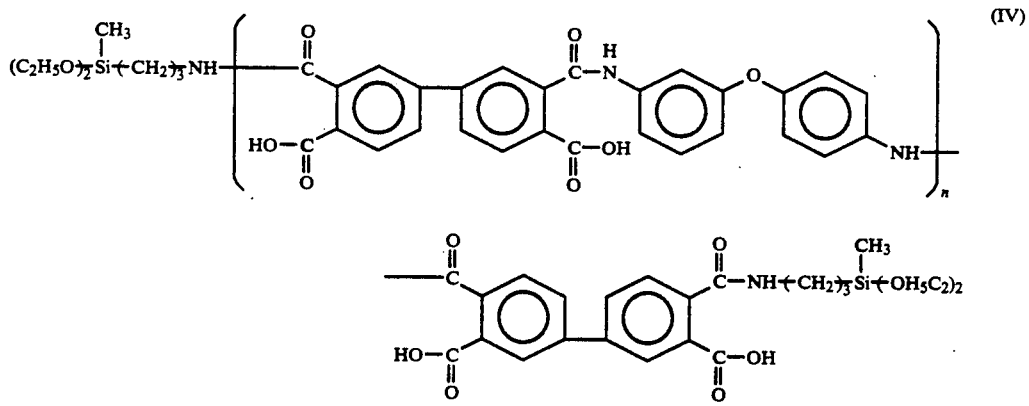

Evaluation of the Bonding Material in the Varnish Form

As shown in FIG. 1, the above bonding material in a varnish form was applied in an area of a square of 11 mm×11 mm through a dispenser onto a ceramic substrate 1 which was 2 mm thick, 50 mm long and 50 mm wide and had leads 2 and Al wirings 3, so that a bonding layer 4 was formed. After the bonding layer 4 was dried at 140° C. for 30 minutes, a semiconductor pellet 5 was heated and bonded at 450° C. for 1 minute while being pressed under a load of 500 g. The pellet 5 did not develop cracks during the thermocompression bonding. The bonding strengths of 10 samples were measured. They showed sufficient strength of 6.9-10.8 MPa.

EXAMPLE 2

The bonding material in the varnish form of Example 1 was coated onto a glass substrate by a doctor blade which defined a clearance of 300 μm. The coating was dried together with the glass substrate at 85° C. for 30 minutes and then peeled off from the glass substrate, whereby a film of 70 μm was obtained. The proportion of the residual solvent in the film was found to be about 30% of the total weight when measured by a differential thermobalance TGD5500 (trade name; manufactured by Shinku Riko K.K.). A section of the film was cut into 11 mm×11 mm squares. Some of the squares were used as bonding materials. The remaining squares were evaluated as to their bonding performance in a similar manner to Example 1. Pellets did not develop cracks. They showed sufficient strength of 6.9-10.8 MPa.

EXAMPLE 3

Another section of the film prepared in Example 2 was dried under tension at 180° C. for 30 minutes. The proportion of the residual solvent was 2% or less. The film was evaluated as a bonding material in a similar manner to Example 2. Similar good results were obtained.

EXAMPLE 4

A portion of the bonding material in the varnish form of Example 1 was added at a weight ratio of 1/1 with flaky Al particles having an average particle size not greater than 2 μm and coated with zinc stearate. The resulting mixture was thoroughly kneaded through a triple roll mill. A suspension thus obtained exhibited thixotropic properties, had a viscosity of about 250 Pa.s as measured at a shear rate of 10 sec$^{-1}$ and 25° C., and was suitable for screen printing.

Using a screen printing plate with a 11 mm×11 mm opening, the suspension was printed on a ceramic substrate 3 of the same type as that referred to in Example 1. After the suspension was dried at 140° C. for 30 minutes, a semiconductor pellet 5 was heated and bonded at 350° C. for 30 minutes in a nitrogen stream while being pressed under a load of 500 g. The pellet 5 did not develop cracks during the thermocompression bonding. The bonding strengths of 10 samples were measured. They showed sufficient strength of 6.9-10.8 MPa. Further, the calorific value of each pellet was about 8° C. per watt of power consumption (hereinafter expressed by the unit of "°C/W") and compared with the bonding material free of Al particles (11°-12° C./W), a reduction as much as about 30% was observed owing to the improved thermal conductivity of the bonding material.

EXAMPLE 5

Using a portion of the suspension prepared in Example 5, films were prepared in a similar manner to Examples 2 and 3. Their bonding strengths and the calorific values of associated pellets were measured. In both bonding strength and calorific value, good results comparable to those obtained in Example 4 were obtained. Further, the pellets did not develop cracks.

EXAMPLE 6

Bonding materials in varnish forms containing polyimide precursors shown in Tables 1-3, respectively, were separately prepared by a similar manner to Example 1. Bonding tests were conducted. No pellet cracking was observed. They showed a good bonding strength of 4.9 MPa or higher.

EXAMPLE 7

Portions of the bonding material in the varnish form prepared in Example 1 were mixed with fine particle samples shown in Table 4, respectively: After preparation of suspensions by the method described in Example 4, bonding tests were conducted. None of the samples developed pellet cracking. They showed a good bonding strength of 4.9 MPa or higher. Further, the calorific values of pellets were improved compared with the bonding material which was free of fine particles of any electroconductive material (11°-12° C./W).

COMPARATIVE EXAMPLE 1

Using "PIQ" (trade name for a conventional condensed polyimide precursor whose molecule ends were not end-capped; product of Hitachi Chemical Co., Ltd.), a bonding test was conducted in a similar manner to Example 1. As a result, almost no bonding took place even when thermo-compression bonding was conducted. The bonding strength was 0.01 MPa or lower.

foil cut in the form of a 11 mm×11 mm square was placed on a ceramic substrate 3 which was 2 mm thick, 50 mm long and 50 mm wide. A semiconductor pellet 5 was placed on the aluminum foil and while being pressed under a load of 500 g, the semiconductor pellet 5 was heated and bonded at 450° C. for 1 minute. As a result, the bonding strength was found to be sufficiently strong, i.e., 4.9 MPa or higher. The respective pellets had good calorific values as small as 8° C./W or less. However, two of the ten pellets developed cracks.

TABLE 1

| No. | $Ar^1$ | $Ar^2$ | $R^1$ | $R^2$ | $R^3$ | m | pellet cracking | Bonding strength (MPa) |
|---|---|---|---|---|---|---|---|---|
| 1 | biphenyl | diphenyl ether | $-C_2H_5$ | — | $-(CH_2)_3-$ | 0 | None | 6.9–10.8 |
| 2 | biphenyl | diphenyl ether | $-C_2H_5$ | $-CH_3$ | $-(CH_2)_3-$ | 2 | None | 6.9–10.8 |
| 3 | biphenyl | diphenyl ether | — | $-CH_3$ | $-(CH_2)_3-$ | 3 | None | 6.9–10.8 |
| 4 | biphenyl | diphenylmethane | $-C_2H_5$ | $-CH_3$ | $-(CH_2)_3-$ | 1 | None | 6.9–10.8 |
| 5 | biphenyl | diphenylsulfone | $-C_2H_5$ | $-CH_3$ | $-(CH_2)_3-$ | 1 | None | 6.9–10.8 |
| 6 | biphenyl | diphenyl ether | $-C_4H_9$ | — | phenylene | 0 | None | 6.9–10.8 |
| 7 | biphenyl | diphenyl ether | phenyl | — | $-(CH_2)_3-$ | 0 | None | 6.9–9.8 |
| 8 | benzophenone | diphenyl ether | $-C_2H_5$ | $-CH_3$ | $-(CH_2)_3-$ | 1 | None | 6.9–10.8 |
| 9 | diphenyl ether | diphenyl ether | $-C_2H_5$ | $-CH_3$ | $-(CH_2)_3-$ | 1 | None | 6.9–10.8 |

$$(R^1O)_{3-m}Si-R^3-NH-\left[\begin{array}{c}O\quad O\\ \|\quad\|\\ -C\quad C-NH-Ar^2-NH-\\ \diagdown Ar^1\diagup\\ HO-C\quad C-OH\\ \|\quad\|\\ O\quad O\end{array}\right]_n\begin{array}{c}O\quad O\\ \|\quad\|\\ -C\quad C-NH-R^3-Si(OR^1)_{3-m}\\ \diagdown Ar^1\diagup\\ OH-C\quad C-OH\\ \|\quad\|\\ O\quad O\end{array} \quad (I)$$

with $R^2_m$ substituents on Si.

COMPARATIVE EXAMPLE 2

Similarly to the evaluation method for bonding materials in the varnish from described Example 1, an Au

TABLE 2

| No. | $Ar^3$ | $Ar^4$ | $R^4$ | pellet cracking | Bonding strength (MPa) |
|---|---|---|---|---|---|
| 1 | biphenyl | diphenyl ether | diphenyl ether | None | 5.9–9.8 |
| 2 | biphenyl | diphenyl ether | diphenylamine | None | 5.9–9.8 |

TABLE 2-continued

| No. | Ar³ | Ar⁴ | R⁴ | pellet cracking | Bonding strength (MPa) |
|---|---|---|---|---|---|
| 3 | biphenyl | phenyl-O-phenyl-CH₃ | methyl-biphenyl | None | 5.9–9.8 |
| 4 | biphenyl | phenyl-O-phenyl-CH₃ | -phenyl-O-phenyl-phenyl | None | 5.9–9.8 |
| 5 | biphenyl | phenyl-CH₂-phenyl-CH₃ | -phenyl-O-phenyl | None | 5.9–9.8 |
| 6 | biphenyl | phenyl-SO₂-phenyl-CH₃ | -phenyl-O-phenyl | None | 4.9–9.8 |
| 7 | biphenyl | phenyl-O-phenyl(CONH₂)-CH₃ | -phenyl-O-phenyl | None | 4.9–9.8 |
| 8 | phenyl-CO-phenyl | phenyl-O-phenyl-CH₃ | -phenyl-O-phenyl | None | 4.9–9.8 |
| 9 | phenyl-O-phenyl-CH₃ | phenyl-O-phenyl-CH₃ | -phenyl-O-phenyl | None | 4.9–9.8 |

$$R^4-NH- \left[ \begin{array}{c} O \quad O \\ \| \quad \| \\ C \quad C-NH-Ar^4-NH- \\ Ar^3 \\ HO-C \quad C-OH \\ \| \quad \| \\ O \quad O \end{array} \begin{array}{c} O \quad O \\ \| \quad \| \\ C \quad C-NH-R^4 \\ Ar^3 \\ OH-C \quad C-OH \\ \| \quad \| \\ O \quad O \end{array} \right]_n \quad (II)$$

TABLE 3

| No. | Ar⁵ | Ar⁶ | R⁵ | pellet cracking | Bonding strength (MPa) |
|---|---|---|---|---|---|
| 1 | biphenyl | phenyl-CH₂-phenyl | HC≡C-phenyl | None | 6.9–10.8 |
| 2 | biphenyl | phenyl-CH₂-phenyl | norbornene | None | 6.9–10.8 |
| 3 | biphenyl | phenyl-CH₂-phenyl | cyclohexene | None | 5.9–9.8 |
| 4 | biphenyl | phenyl-O-phenyl | HC≡C-phenyl | None | 5.9–10.8 |
| 5 | biphenyl | phenyl-SO₂-phenyl | HC≡C-phenyl | None | 6.9–9.8 |

TABLE 3-continued

| No. | Ar⁵ | Ar⁶ | R⁵ | pellet cracking | Bonding strength (MPa) |
|---|---|---|---|---|---|
| 6 | (diphenyl ketone structure) | (diphenylmethane structure) | HC≡C–phenyl | None | 6.9–10.8 |
| 7 | (diphenyl ether structure) | (diphenylmethane structure) | HC≡C–phenyl | None | 6.9–10.8 |

$$
\begin{array}{c}
R^5-\overset{O}{\underset{\|}{C}}-\left[NH-Ar^6-NH-\overset{O}{\underset{\|}{C}}-\overset{Ar^5}{\underset{HO-\underset{\|}{C}}{\overset{\overset{O}{\underset{\|}{C}}}{\diagup\diagdown}}}\overset{O}{\underset{\|}{C}}-\right]_n NH-R^6-NH-\overset{O}{\underset{\|}{C}}-R^5 \\
\overset{|}{C}-OH \qquad\qquad HO-\overset{\|}{C} \quad \overset{\|}{C}-OH \qquad\qquad \overset{|}{C}-OH \\
\overset{\|}{O} \qquad\qquad\qquad \overset{\|}{O} \quad \overset{\|}{O} \qquad\qquad\qquad \overset{\|}{O}
\end{array} \tag{III}
$$

TABLE 4

| No. | Additive | Amount added (Additive)/(solid weight of varnish), weight ratio | Average particle size, μm | pellet cracking | Bonding strength (MPa) | Calorific value of pellet, °C./W |
|---|---|---|---|---|---|---|
| 1 | Al | 0.1 | ≧2 | None | 6.9–10.8 | 9–10 |
| 2 | Al | 0.2 | ≧2 | None | 6.9–10.8 | 8–10 |
| 3 | Al | 0.5 | ≧2 | None | 6.9–10.8 | 8–9 |
| 4 | Al | 2 | ≧2 | None | 6.9–9.8 | 8 |
| 5 | Al | 5 | ≧2 | None | 6.9–9.8 | 8 |
| 6 | Ag | 1 | ≧5 | None | 6.9–9.8 | 8 |
| 7 | Au | 1 | ≧2 | None | 6.9–9.8 | 8 |
| 8 | Cu | 1 | ≧2 | None | 5.9–9.8 | 8 |
| 9 | Ni | 1 | ≧2 | None | 5.9–9.8 | 8–10 |
| 10 | Al₂O₃ | 1 | ≧1 | None | 6.9–9.8 | 8–9 |
| 11 | SiO₂ | 1 | ≧0.1 | None | 6.9–9.8 | 9–10 |
| 12 | In₂O₃/SnO₂ | 1 | ≧0.1 | None | 6.9–9.8 | 9–10 |
| 13 | SnO₂/Sb₂O₅ | 1 | ≧0.1 | None | 6.9–9.8 | 9–10 |
| 14 | SiC | 1 | ≧1 | None | 6.9–9.8 | 8–10 |
| 15 | AlN | 1 | ≧1 | None | 6.9–9.8 | 8–10 |

We claim:

1. A heat-resistant bonding material comprising at least one of a polyimide precursor end-capped at molecule ends thereof, an imide compound formed from the polyimide precursor or a mixture thereof admixed with fine particles of at least one metal selected from the group consisting of Al, Ag, Au, Cu and Ni, said fine particles being surface-treated with at least one of stearic acid, zinc stearate and aluminum stearate.

2. The bonding material of claim 1, wherein the polyimide precursor is represented by the following formula:

Formula (1)

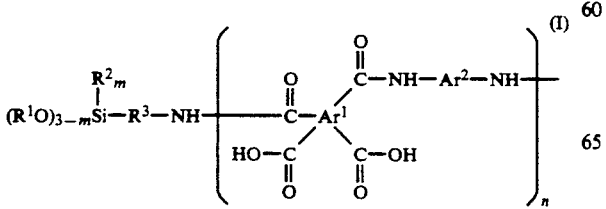

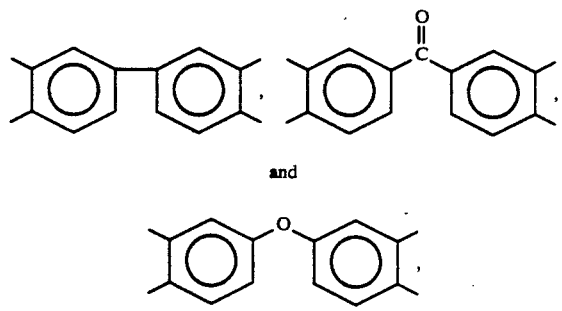

wherein Ar¹ means at least one group selected from the following groups:

(biphenyl), (benzophenone), and (diphenyl ether),

Ar² denotes at least one group selected from the following groups:

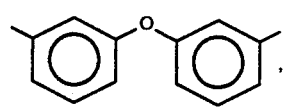

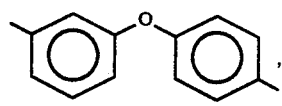

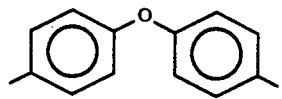

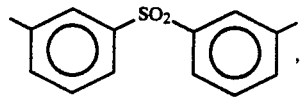

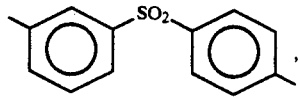

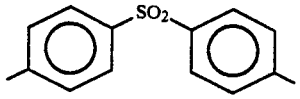

and

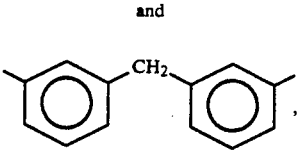

R$^1$ represents a methyl, ethyl, propyl, butyl or phenyl group, R$^2$ is a methyl, ethyl, butyl, phenyl, methoxy, ethoxy, propoxy, butoxy or phenoxy group, R$^3$ means a methylene, ethylene, propylene, butylene or phenylene group, m stands for 0, 1, 2, or 3, and n ranges from 1 to 100.

3. The bonding material of claim 1, wherein the polyimide precursor is represented by the following formula:

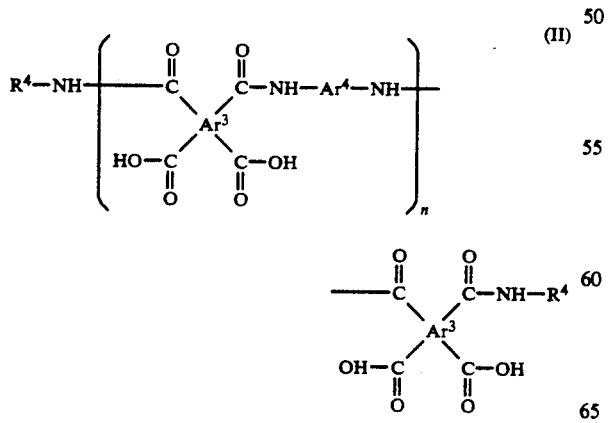

wherein R$^4$ means at least one group selected from the following groups:

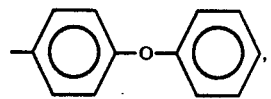

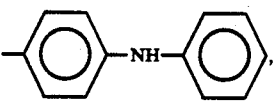

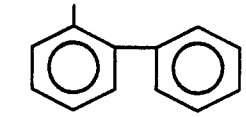

and

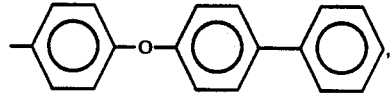

Ar$^3$ denotes at least one group selected from the following groups:

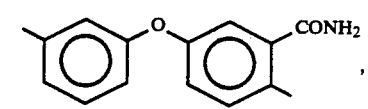

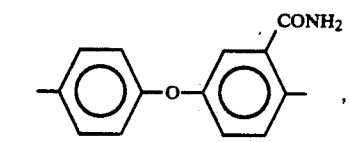

and

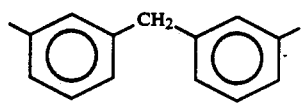

Ar$^4$ represents at least one group selected from the following groups:

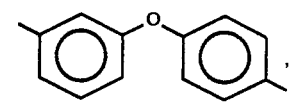

-continued

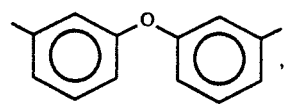

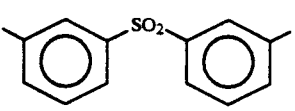

and

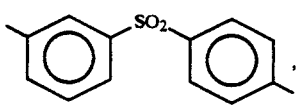

and n ranges from 1 to 100.

4. The bonding material of claim 1, wherein the polyimide precursor is represented by the following formula (III):

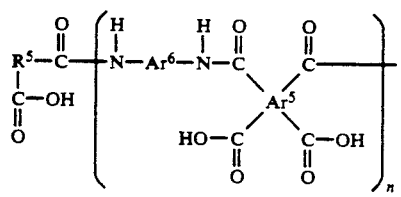

(III)

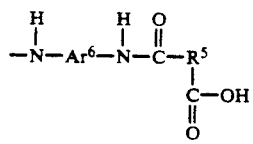

wherein $Ar^5$ means at least one group selected from the following groups:

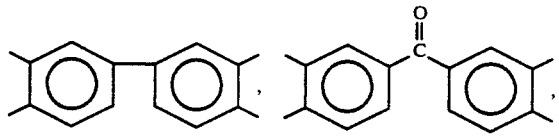

and

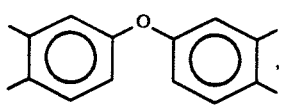

$Ar^6$ denotes at least one group selected from the following groups:

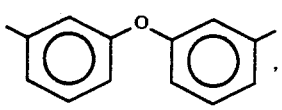

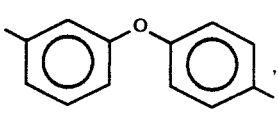

-continued

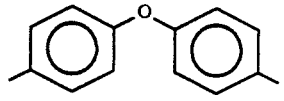

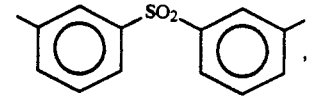

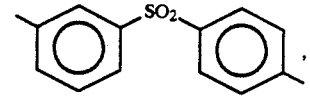

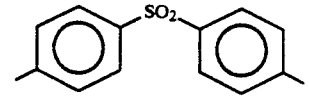

and

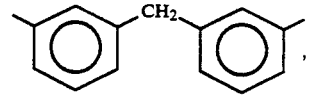

$R^5$ represents at least one group selected from the following groups:

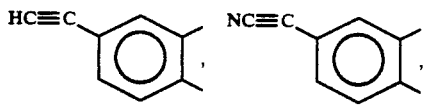

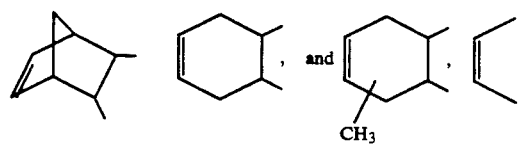

and n ranges from 1-100.

5. The bonding material of claim 1, 2, 3, or 4, which is in the form of a varnish.

6. The bonding material of claim 5, which is in the form of a varnish.

7. The bonding material of claim 6, wherein the solid weight accounts for 10–95% and the remainder comprises a solvent.

8. The bonding material of claim 1, 2, 3, or 4, which is in the form of a film.

9. The bonding material of claim 8, wherein the solid weight accounts to 60–100 wt. % and the remainder comprises a solvent.

10. The bonding material of claim 7, wherein the solvent is at least one solvent selected from N,N-dimethylacetamide, N-methyl-2-pyrrolidone, benzylpyrrolidone and diethylene glycol dimethyl ether.

11. The bonding material of claim 1, wherein the fine particles have an average particle size not greater than 10 μm.

12. The bonding material of claim 1, wherein the fine particles are in the form of flakes.

13. The bonding material of claim 1, wherein the mixing weight ratio of the fine particles to the polyimide precursor end-capped at molecule ends thereof and/or the imide compound formed from the polyimide precursor ranges from 0.05 to 5.

14. The bonding material of claim 9, wherein the solvent is at least one solvent selected from N, N-dimethylacetamide, N-methyl-2-pyrrolidone, benzylpyrrolidone and diethylene glycol dimethyl ether.

* * * * *